United States Patent [19]

Canas-Rodriguez et al.

[11] 3,720,771

[45] March 13, 1973

[54] 3-SUBSTITUTED-1-PHENYL-INDOLINES AND INDOLINONES IN COMPOSITION FOR ALLEVIATING MENTOL DEPRESSION

[75] Inventors: Antonio Canas-Rodriguez, Peter Rodway Leeming, both of Canterbury, Kent, England

[73] Assignee: Pfizer Inc., New York, N.Y.

[22] Filed: Feb. 14, 1972

[21] Appl. No.: 226,291

Related U.S. Application Data

[62] Division of Ser. No. 885,321, Dec. 15, 1969, Pat. No. 3,644,403.

[30] Foreign Application Priority Data

Dec. 18, 1968 Great Britain.....................60,083/68

[52] U.S. Cl..................424/274, 424/248, 424/250, 424/267
[51] Int. Cl. .............................................A61v 27/00
[58] Field of Search...............424/248, 250, 267, 274

[56] References Cited

UNITED STATES PATENTS 3,184,466  5/1965  Hennig et al. ................260/326.11 X
3,468,907  9/1969  Sherlock ..........................260/326.12

Primary Examiner—Stanley J. Friedman
Attorney—Connolly and Hutz

[57] ABSTRACT

Novel 3-mono-aminoalkyl-1-phenyl-indolines and 2-indolinones are disclosed.

5 Claims, No Drawings

3-SUBSTITUTED-1-PHENYL-INDOLINES AND INDOLINONES IN COMPOSITION FOR ALLEVIATING MENTOL DEPRESSION

CROSS-REFERENCE TO RELATED APPLICATION

This application is a division of application Ser. No. 885,321 filed Dec. 15, 1969 now U.S. Pat. 3,644,403.

BACKGROUND OF THE INVENTION

This invention relates to certain novel therapeutic agents. More particularly, it relates to 3-monoaminoalkyl-1-phenyl-indolines and 2-indolinones which have useful anti-depressant actions.

SUMMARY OF THE INVENTION

The present invention disclosed compounds having the formula:

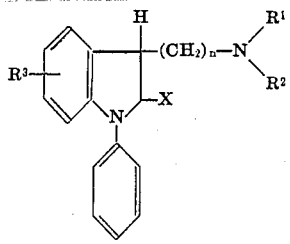

wherein $R^1$ and $R^2$ are each selected from the group consisting of hydrogen, alkyl from one to four carbon atoms, benzyl and $R^1$ and $R^2$ when taken together, complete a ring selected from the group consisting of piperidino, pyrrolidino, morpholino, piperazino, N'-benzylpiperazino, N'-alkylpiperazino and N'-hydroxyalkylpiperazino, said alkyl containing from one to four carbon atoms; $R^3$ is selected from the group consisting of hydrogen, nitro and halogen (F, Cl, Br, I); X is selected from the group consisting of two hydrogen atoms and an oxygen atom; n is an integer of from 2 to 4; and pharmaceutically acceptable acid addition salts thereof.

A particularly preferred embodiment of the above described features of this invention concerns these compounds indicated by the above formula when $R^3$ is hydrogen and n is 3.

In addition, there is claimed a method of alleviating mental depression in a host which comprises administering to the host an effective amount of a compound selected from the group consisting of those with the formula:

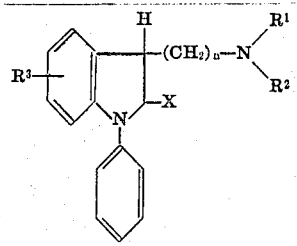

wherein $R^1$ and $R^2$ are each selected from the group consisting of hydrogen, alkyl of from one to four carbon atoms, benzyl and $R^1$ and $R^2$ when taken together complete a ring selected from the group consisting of piperidino, pyrrolidino, morpholino, piperazino, N'-benzylpiperazino, N'-alkylpiperazino and N'-hydroxyalkylpiperazino, said alkyl containing from one to four carbon atoms; $R^3$ is selected from the group consisting of hydrogen, nitro and halogen (F, Cl, Br, I); X is selected from the group consisting of two hydrogen atoms and an oxygen atom; n is an integer of from 2 to 4; and pharmaceutically acceptable acid addition salts thereof.

The compounds of this invention have marked activity on the central nervous system of the host which is treated. They have properties in common with antidepressant drugs. In particular, they antagonize the sedation induced in rats by intraperitoneally injected tetrabenazine, potentiate the response to low frequency electrical stimulation of the nictitating membrane of the cat, potentiate the effects of injected epinephrine or norepinephrine on the blood pressure of the cat, and reverse the hypothermia caused by intraventricularly injected norepinephrine in the mouse.

DETAILED DESCRIPTION OF THE INVENTION

The compounds of this invention fall into two distinct classes. The first class concerns 3-monosubstituted-1-phenyl-2-indolinones and the second concerns the reduced analogs thereof. More specifically, one method of obtaining the latter group is by reducing the keto function in the 2-position to a methylene function. There exist several methods for synthesizing the indolinone derivatives, and one mode of preparation for the second group, that is, the indolines, comprises the reduction of the aforesaid indolinones to the corresponding indolines. The aforesaid chemical reduction can be accomplished by means of hydroboration. The indoline compounds may also be prepared from 1-phenyl-3-indolinyl carboxylic acids, and also from 3-substituted-1-phenylindoles by reduction of the heterocyclic portion of the indole ring of the latter compounds. Hence, not only are the indolinone compounds useful per se for the utility described herein, but they are also valuable chemical intermediates for the preparation of the useful indoline compounds.

A 3-unsubstituted 1-phenyl-2-indolinone of the formula:

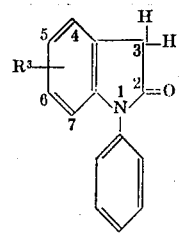

may be reacted with an alkali metal (or a hydride, amide or alkoxide thereof) in a suitable solvent, e.g., toluene or dimethylformamide, to form an alkali metal derivative of the indolinone and then with a halogenated amine of the formula:

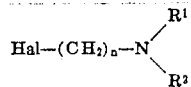

where neither $R^1$ nor $R^2$ is hydrogen, to yield a compound of the formula:

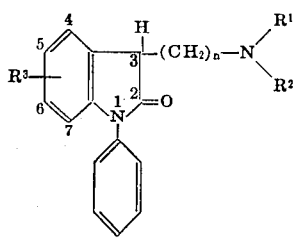

However, in this reaction substantial amounts of 3,3-bis (aminoalkyl) derivatives are formed. We have now discovered that it is preferred to use instead of an alkali metal, either thallium metal or a thallous alkoxide, since under these conditions 3-mono-(aminoalkyl) derivatives are formed.

Use of thallium metal or a thallous alkoxide precludes the formation of 3,3-bis (aminoalkyl) derivatives. Previous methods as disclosed in Belgian patent 711,058 required the use of a 3-monosubstituted-1-phenyl-2-indolinone, whereas this present invention discloses the use of a 3-unsubstituted-1-phenyl-2-indolinone to produce a 3-monosubstituted derivative.

The preferred method of synthesis of the indolinone compounds of this invention involves dissolving a 1-phenyl-2-indolinone in a suitable organic solvent, such as toluene, benzene or dimethylformamide. To this an equimolar quantity of thallium metal or a thallous alkoxide, such as thallous ethoxide is added. A precipitate is formed which is then redissolved in a suitable solvent, such as dimethylformamide. To this is added a halogenated alkyl amine, such as 3-dimethylaminopropyl chloride in equimolar proportions or in a slight excess. The mixture is heated under reflux for about 4 to 8 hours. Work-up consists of evaporating off the solvent, cooling, mixing with water, extracting with ether, separating, drying and evaporating to give product.

The resulting indolinone may be reduced to the corresponding indoline, wherein X is $H_2$, by the use of diborane as the reducing agent. The indolinone to be reduced is dissolved in suitable solvent, e.g., tetrahydrofuran and in a flask fitted with an inlet from a diborane generator. The generated diborane is allowed to pass through the solution for about 3 hours whereupon the resulting solution is then cooled, acidified with 5N hydrochloric acid, and the solvents are removed leaving an oil which is subsequently extracted with ether and converted to a suitable acid addition salt such as the hydrogen maleate salt.

Compounds in which X is $H_2$ may also be prepared from 1-phenyl-3-indolinyl carboxylic acids or alcohols of the formulas:

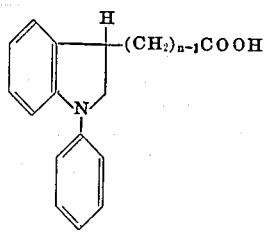

or

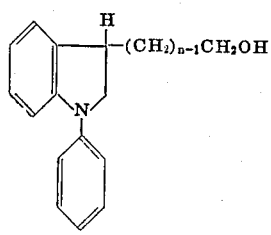

by converting the acid (or a suitable ester thereof) to the appropriate amide by reaction with ammonia or amine of the formula $R^1 R^2NH$ and reducing the amide with lithium aluminum hydride, or by converting the alcohol to the appropriate amine by reaction of a suitable ester of the alcohol with an amine of the formula $R^1 R^2NH$.

1-phenyl-3-indolinyl carboxylic acids and alcohols are prepared from 3-indolyl carboxylic acids of the formula:

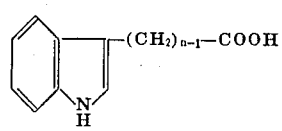

(or suitable esters thereof) by hydrogenation of the acid or ester at a sufficiently high pressure (e.g., 4000 psi) in the presence of Raney nickel as described by Kornfeld, et. al. in J.Amer. Chem. Soc., Vol. 78, p. 3096 (1956) or at lower pressure in the presence of a nickel or palladium or platinum catalyst freshly prepared in situ, to yield the corresponding 3-indolinyl carboxylic acid or ester which is then either phenylated direct by the Ullmann reaction, with a phenyl halide and copper powder, or first reduced with lithium aluminum hydride to the alcohol and then phenylated.

Compounds in which X is $H_2$ may also be prepared from 3-aminoalkyl-substituted 1-phenyl-indoles of the formula:

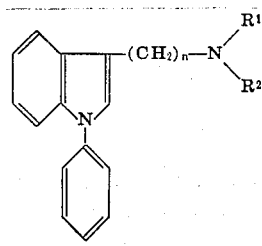

by reduction with sodium in liquid ammonia. In this method, the indole starting material is dissolved in a suitable solvent, e.g. tetrahydrofuran, the solution is added to liquid ammonia (anhydrous) and small pieces of sodium are added until a blue color persists in the solution for at least several minutes. Ammonium chloride is then added to decompose the complex product and the ammonia evaporated off. The pure product is recovered by evaporating off the solvent, extracting into ether, drying and evaporating off the ether or precipitating as a suitable salt, e.g. the oxalate, by adding an ethereal solution of the appropriate acid.

There exist several process modifications which find application in the present disclosure. For instance, it may be possible to convert an N,N-di-substituted amino compound to the corresponding N-mono-substituted derivative. To illustrate, a dimethylamino compound can be converted to the monomethylamino derivative by treatment with an alkyl chloroformate, resulting in an intermediate alkoxycarbonyl derivative from which the alkyloxycarbonyl group is subsequently removed by hydrolysis under acidic or basic conditions.

Furthermore, a benzyl moiety attached to the nitrogen of the amino group may be converted to hydrogen by hydrogenation in the presence of palladium.

Another process modification concerns the placement of various substituents onto the fused benzene ring. For example, treatment of an indoline or 2-indolinone with sulfuryl chloride in glacial acetic acid results in the formation of the corresponding 5-chloro compound, Similarly, treatment with bromine in glacial acetic acid provides the corresponding 5-bromo compound. Some chlorination or bromination may also occur in the 3-position, however, when a 2-indolinone is treated in this manner, and products of this side reaction may have to be eliminated to obtain the pure 5-substituted 2-indolinone.

The compounds of this invention have the ability to alleviate mental depression particularly when administered orally. Additionally, the compounds of the invention give positive results in tests in experimental animals designed to show possession of the following properties:

1. potentiation of amphetamine excitation.
2. Antagonism of tetrabenazine sedation.
3. Antagonism of reserpine hypothermia.
4. Antagonism of nonepinephrine hypothermia.
5. Potentiation of stimulation of the nictitating membrane.
6. Potentiation of the effect of norepinephrine on blood pressure.

These tests are well established methods for testing potential drugs in order to indicate whether they possess anti-depressant properties. Tests 1 and 2 are carried out in rats via oral administration. Tests 3 and 4 are run on mice, wherein test 3 utilizes intraperitoneal administration and test 4 is by oral administration. The last two, that is, 5 and 6 use the intravenous mode of administration wherein the host is a cat.

The compounds of the invention exist in D and L optically active isomeric forms, by virtue of the asymmetric carbon atom at position 3 in the indoline nucleus, and the invention comprehends the compounds in the separated D and L forms, as well as the racemic DL-mixtures produced by the above methods.

Acids from which pharmaceutically-acceptable addition salts of the compounds of the invention can be prepared are those which form non-toxic acid addition salts containing pharmaceutically-acceptable anions, such as the hydrochloride, hydrobromide, hydroiodide, sulfate or bisulfate, phosphate or acid phosphate, acetate, maleate, fumarate, lactate, tartrate, citrate, gluconate, saccharate, and p-toluene sulfonate salts.

The compounds of the invention can be administered along, but will generally be administered in admixture with a pharmaceutical carrier selected with regard to the intended route of administration and standard pharmaceutical practice. For example, they may be administered orally, preferentially in the form of tablets containing such excipients as starch or lactose, or in capsules either alone or admixture with excipients, or in the form of solutions or suspensions containing flavoring or coloring agents. They may be injected parenterally, for example, intramuscularly or subcutaneously. For parenteral administration, they are best used in the form of a sterile aqueous solution which may contain other solutes, for example, enought salts or glucose to make the solution isotonic.

With respect to dosage levels, a broad dosage range of 5 to 500 mg./day is appropriate. However, on a body-weight basis, the dosage range would be from about 0.1 to about 5.0 milligrams per kilogram per day. A particularly preferred range for adults is from 0.3 to about 3.0 mg./kg./day. The physician in any event will determine the actual dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

EXAMPLE I

To 1-phenyl-2-indolinone (20.9 g., 0.1 mole) dissolved in hot, dry benzene (200 mls.) thallous ethoxide (24.5 g. 0.1 mole) is added. On cooling a heavy precipitate of the thallous derivative is obtained. Dry dimethylformamide (150 ml.) is added to the mixture followed by 3-dimethylaminopropyl chloride, (13.6 g., 0.11 mole), freshly prepared from the corresponding hydrochloride and KOH pellets. The mixture is heated to 90° and stirred for 6 hours, after which the solvents are evaporated in vacuo. Traces of dimethylformamide and alkylating reagent are eliminated by azeotropic distillation in vacuo with xylene. The residual oil is treated with water and extracted with ether, and the etheral liquors are filtered through a small layer of active alumina. The ethereal solution is dried and treated with ethereal solution of anhydrous oxalic acid. A white precipitate is obtained which is thoroughly washed with ether and recrystallized from isopropanol five times to give 2 g. of pure 3-(3-dimethylaminopropyl)-1-phenyl-2-indolinone oxalate as a white solid containing water of crystallization (half a molecule). M. Pt.: 154°–155°, Analysis:

Calcd. for: $C_{21}H_{24}NO_5 \cdot H_2O$: C, 64.10; H, 6.40; N, 7.29

Found: C, 64.33; H, 6.37; N, 7.08

EXAMPLE II

By a similar technique as described in Example I the following compounds are prepared wherein a stoichiometric equivalent amount of the appropriate agent is used in lieu of 3-dimethylaminopropyl chloride with comparable results:

3-[2-(N-benzyl-N-methylamino)ethyl]-1-phenyl-2-indolinone hydrogen maleate (From 2-(N-benzyl-N-methylamino)ethyl chloride), 3-[3-(N-benzyl-N-methylamino)propyl]-1-phenyl-2-indolinone hydrochloride (From 3-(N-benzyl-N-methylamino)propyl chloride), 3-(2-dimethylaminoethyl)-1-phenyl-2-indolinone hydrochloride (From 2-dimethylaminoethyl chloride), 3-[2-(4-methyl-1-piperazinyl)ethyl]-1-phenyl-2-indolinone di-hydrogen maleat (From 2-(4-methyl-1-piperazinyl)ethyl chloride), 3-(3-piperidinopropyl)-1-phenyl-2-indolinone hydrogen oxalate (From 3-piperidino-propyl chloride), 3-[2-(4-hydroxyethyl-1-piperazinyl)ethyl]-1-phenyl-2-indolinone di-hydrogen maleate (From 2-(4-hydroxyethyl-1-piperazinyl)ethyl chloride), 3-[3-(4-methyl-1-piperazinyl)propyl]-1-phenyl-2-indolinone dihydrogen maleate (From 3-(4-methyl-1-piperazinyl)propyl chloride), 3-[3-(4-hydroxyethyl-1-piperazinyl)propyl]-1-phenyl-2-indolinone di-hydrogen maleate (From 3-(4-hydroxyethyl-1-piperazinyl)propyl chloride).

3-(3-benzylaminopropyl)-1-phenyl-2-indolinone)hydrgen oxalate (From 3-benzylamino propyl chloride).

EXAMPLE III 3-(3-dimethylaminopropyl)-1-phenyl-2-indolinone (0.136 mol.) in tetrahydrofuran (400 ml.) is placed in a flask fitted with an inlet from a diborane generator. The diborane generator is charged with sodium borohydride (2.5 mol.) and dimethyl digol (600 ml.). After a preliminary purge of the apparatus for fifteen minutes with nitrogen, the cautious addition of boron trifluoride diethyl etherate (3.5 mol.) to the generator is commenced with stirring and ice-cooling. The generation of diborane takes three hours and at the end of this period the apparatus is purged with nitrogen for thirty minutes and the tetrahydrofuran solution in the reaction vessel is heated under reflux for one hour. The solution is then cooled in ice and treated with 5 N HCl (100 ml.). The solvents are removed in vacuo and the resulting material dissolved in hot water, adjusted to a basic pH and extracted with ether. The extract is then worked up in the usual manner to give 3-(3-dimethylaminopropyl)-1-phenyl-indoline.

In a similar manner as above the following compounds are prepared from their corresponding indolinones:

3-(2-dimethylaminoethyl)-1-phenyl-indoline hydrogen maleate

3-[2-(N-benzyl-N-methylamino)ethyl]-1-phenyl-indoline

3-[3-(N-benzyl-N-methylamino)propyl]-1-phenyl-indoline

EXAMPLE IV 3-(3-indolyl)propionic acid is hydrogenated at 4000 psi in the presence of Raney nickel as described by Kornfeld, et. al. in J. Amer. Chem. Soc., vol. 78, page 3096 (1956). The resultant 3-(3-indolinyl)propionic acid is then phenylated by Ullman reaction with phenyl iodide and copper powder to give 1-phenyl-3-(3-indolinyl)propionic acid which is then reacted with methylamine to form an amide. The amide is then reduced with lithium aluminum hydride using standard reaction techniques and conditions to produce 3-(3-methyl-aminopropyl)-1-phenyl-indoline.

EXAMPLE V 3-(3-dimethylaminopropyl)-1-phenyl-2-indolinone (0.033 mol.) in dry xylene (75 ml.) is treated with ethyl chloroformate (10 ml.) and the mixture is warmed to 60°–70 for an hour. An evolution of gas takes place and more ethyl chloro-formate (10 ml.) is added and the heating is continued for one and a half hours. The excess of ethyl chloroformate is removed by distillation and the volume of the reaction mixture is maintained by the addition of dry xylene. The mixture is heated under reflux for four hours, cooled, extracted with 1 NHCl, washed with water, dried over anhydrous $Na_2SO_4$ and evaporated. The resultant syrup is heated under reflux for 16–17 hours with a 40 percent solution of hydrobromic acid in glacial acetic acid (50 ml.). The mixture is evaporated in vacuo and the resultant syrup is treated with water and ether extracted to remove unreacted urethane. The aqueous layer is basified with a cold aqueous solution of sodium carbonate and ether extracted. The ethereal extract is dried over magnesium sulfate, filtered and treated with an ethereal solution of HCl. 3-(3-methylamino propyl)-1-phenyl-2-indolinone hydrochloride is obtained upon further recrystallization.

EXAMPLE VI

3-[3- (N-benzyl-N-methylamino)propyl]-1-phenyl-2-indolinone (0.4 mol.) is dissolved in absolute ethanol (650 ml.) and a solution of palladium chloride (6 g.) in water (40 ml.) containing sodium chloride (4 g.) is added. The mixture is cautiously treated with a solution of sodium borohydride (6 g.) in water (40 ml.) over a period of ten minutes with stirring. Stirring is continued for a further 15 minutes and the pH adjusted to 1 with concentrated hydrochloric acid. This mixture is hydrogenated at 50 psi and 60° for 16 hours by which time the theoretical amount of hydrogen has been adsorbed. The mixture is filtered and the solvent removed under reduced pressure. The residual oil is dissolved in water (250 ml.), basified with 5 N sodium hydroxide solution and extracted with ether (4 × 200 ml.). The extracts are dried over magnesium sulfate and treated with dry hydrogen chloride. The resulting product is further purified giving 3-(3-methylaminopropyl)- 1-phenyl-2-indolinone hydrochloride.

EXAMPLE VII 3-(3-Methylamino-propyl)-1-phenyl-indole hydrochloride (1.5 g.) is dissolved in water (5 ml.), basified with 5N NaOH and extracted into ether. The solvent is evaporated and the residual free base is taken into 10 ml. of dry tetrahydrofuran. This solution is added to liquid ammonia (80 ml.) and, while stirring under dry conditions, sodium (1 g.) is added in small pieces, each piece after the first being added as soon as the blue color disappeared. The reaction is taken to be complete when the blue color persisted for more than 7–10 minutes. Solid ammonium chloride is then added and the ammonia is evaporated slowly. The final solution is evaporated in vacuo and the residual oil is taken up into dry ether. This solution is treated with ethereal oxalic acid solution and the precipitated oxalate is recrystallized once from isopropanol-water to yield 1.2 g. of 3-(3-methylamino-propyl)-1-phenyl-indoline hydrogen oxalate. M. pt: 179°–180°

Calcd. for: $C_{20}H_{24}N_2O_4$: C, 67.39; H, 6.79; N, 7.86

Found: C, 67.45; H, 6.75; N, 7.79

A small sample of the oxalate is converted into the free base and the mass spectrum is obtained showing a molecular ion of 266, concordant with the calculated molecular weight.

The compound prepared in Example VII has also been prepared according to the following Example:

EXAMPLE VIII

1. Ethyl 3-(3-indolyl)propionate (21.7 g., 0.1 mol) is dissolved in glacial acetic acid (250 ml.) and 2N HCl (50 ml., 0.1 mol) is added. This solution is hydrogenated at 60-70° and atmospheric pressure over a pre-reduced platinum oxide catalyst (20 g.), stirring carefully throughout. The catalyst is then filtered off and the solution is evaporated under reduced pressure to a thick oil. This is washed with ether and the residual oil is carefully neutralized with $Na_2CO_3$ solution and extracted into ether. Evaporation of the dried ethereal extracts gives an oil which is distilled in vacuo at 150°–155°/0.2 mm. mercury to yield 19 g. of ethyl 3-(3-indolinyl)propionate.

2. Ethyl 3-(3-indolinyl-)propionate (15.33 g., 0.7 mol) is dissolved in tetrahydrofuran (50 ml.) and this solution is added carefully to a refluxing solution of lithium aluminum hydride (3.8 g., 0.1 mol) in tetrahydrofuran (200 ml.). The mixture is stirred and heated under reflux for 4 hours, and the complex is then destroyed by the addition of 3.8 g. of water followed by 3.8 ml. of 5N NaOH. The inorganic precipitate is filtered off and the solution evaporated to dryness when it yielded a thick oil. This is distilled in vacuo at 180°–210°/0.2 mm mercury to yield 11.5 g. of 3-(3-indolinyl)propanol.

3. To 3-(3-indolinyl)propanol (11.5 g., 0.065 mol) dissolved in hexamethyl phosphoramide (100 ml.), cuprous bromide (0.1 g.) and anhydrous $K_2CO_3$ (13.9 g., 0.1 mol) are added. The mixture is heated to 170° and bromobenzene (15.7 g., 0.1 mol) is added dropwise with stirring. The stirring and heating at 170°–180° is maintained for 6 hours, when it is poured into a large volume of water and extracted with ether. The ethereal liquors are dried over $K_2CO_3$ and evaporated in vacuo to give a thick oil, which is distilled in vacuo at 210-220°/0.1 mm. mercury to yield 10 g. of 1-phenyl-3-(3-indolinyl)propanol.

4. 1-Phenyl-3-(3-indolinyl)propanol (10 g., 0.044 mol) in dry benzene (50 ml.) is added to a cold mixture of pyridine (3.5 g., 0.044 mol) and p-toluenesulphonyl chloride (8.4 g., 0.044 mol) in benzene (50 ml.). The mixture is allowed to stand for 12 hours and then poured into water. The benzenic layer is dried over $Na_2SO_4$ and treated with a large excess of 33 percent ethanolic solution of methylamine (100 ml.) in a stainless steel bomb at 100° and left to stand for 12 hours.

The mixture is then evaporated to dryness and the residue basified with 5N NaOH and extracted with ether. The ethereal solution is dried over $Na_2CO_3$ and evaporated to yield an oil. This is taken up into dry ether and treated with an ethereal solution of oxalic acid. The precipitate was recrystallized several times from isopropanol-water to give g. of pure 3-(3-methylamino propyl)-1-phenyl-indoline hydrogen oxalate. M.P. 179°–180°.

Analysis:
Calcd. for: $C_{20}H_{24}N_2O_4$: C, 67.39; H, 6.79; N, 7.86
Found: C, 67.; H, 6.; N, 7.

EXAMPLE IX

Sulfuryl chloride (0.03 mol.) in glacial acetic acid (10 ml.) is added to a cooled solution of 3-(3-dimethylaminopropyl)-1-phenyl-2-indolinone hydrochloride (0.03 mol.) in glacial acetic acid (100 ml.), the temperature being kept below 20°. The mixture is stirred at room temperature for 2 hours, evaporated, adjusted to a basic pH and extracted into ether. The dried ethereal solution is treated with dry HCl gas and the resultant product, which may contain some 3-chloro-compound, is purified to give 5-chloro-3-(3-dimethylaminopropyl)-1-phenyl-2-indolinone hydrochloride.

EXAMPLE X

To a cooled solution of 3-(3-dimethylaminopropyl)-1-phenyl-2-indolinone hydrochloride (0.01 ml.) in glacial acetic acid (30 ml.) a solution of bromine (1.60 g.) in glacial acetic acid (5 ml.) is added with stirring. The mixture is allowed to stand at room temperature for thirty minutes, after which it was evaporated, adjusted to a basic pH and extracted with ether. The dried ethereal solution is treated with dry HCl gas and the resultant product, which may contain some 3-bromo-compound, is purified to give 5-bromo-3-(3-dimethylaminopropyl)-1-phenyl-2-indolinone hydrochloride.

EXAMPLE XI

Stable tablets and capsules of 3-(3-dimethylaminopropyl)-1-phenyl-2-indolinone hydrochloride are made as follows:

| Tablets | mg tablet |
|---|---|
| 3-(3-dimethylaminopropyl)-1-phenyl-2-indolinone hydrochloride | 10.0 |
| Dicalcium phosphate | 120.0 |
| Corn starch | 20.0 |
| Magnesium stearate | 1.6 |
| Sodium laurylsulfate | 0.2 |

The ingredients are blended and compressed into tablets. These tablets are then broken into granules and recompressed into finished tablets.

| Capsule | mg capsule |
|---|---|
| 3-(3-dimethylaminopropyl)-1-phenyl-2-indolinone hydrochloride | 10.0 |
| Corn starch | 127.0 |
| Microcrystalline cellulose | 127.0 |
| Magnesium stearate | 5.4 |
| Sodium laurylsulfate | 0.6 |

The ingredients are blended and filled into a hard gelatine capsule of suitable size.

EXAMPLE XII

Following the procedure of Example I but using sodamide or sodium hydride in place of thallous ethoxide, substantial amounts of 3,3-bis(3-dimethylaminopropyl)-1-phenyl-2-indolinone is formed. This indicates that this procedure is unsuitable for the preparation of 3-mono-substituted derivatives.

EXAMPLE XIII

The products of Examples I and VII have been evaluated in several different tests designed to show that they have properties in common with known antidepressant drugs. The results of these tests and details of the test systems are shown in the following Table and the notes appended thereto.

In the Table, comparative results are also given for the 3-methyl-substituted analogs of the products of Examples I and VII. These 3-methyl-substituted analogs are the products of Examples I and X of both our copending application Sec. No. 706672 filed Feb. 19, 1968 and now abandoned and our copending application Ser. No. 718,943 filed Apr. 4, 1968 and now U.S. Pat. No. 3,574,232, and are identified in the Example XIII of each of these applications as compound (b) of Table I and compound (c) of Table II, respectively.

| Test | A product of Example I | B 3-methyl analog of (A) | C product of example VII | D 3-methyl analog of (C) |
|---|---|---|---|---|
| (1) | ++/+++ | ++ | ++/+++ | +++ |
| (2) | ++ | 0 | +++ | ++ |
| (3) | +++ | +++ | +++ | + |
| (4) | − | − | +++ | ++ |
| (5) | − | − | +/++ | +/++ |
| (6) | − | − | +++ | +++ |

The rating of activity for the above tests is as follows:
0 = inactive
+ = slightly active
++ = moderately active
+++ = very active The test systems were as follows:
1. Potentiation of amphetamine-induced excitation in the rat — 25mg/Kg of test compound administered orally — cf. Quinton, et al, Nature, 200, 178 (1963).
2. Antagonism of tetrabenazine-induced sedation in the rat — 50mg/Kg followed by a further 20mg/Kg, administered orally — cf. Sulser, et al., J.Pharm.Exp.Therap., 144, 321 (1964).
3. Antagonism of reserpine-induced hypothermia in the mouse — 10mg/Kg administered intraperitoneally, 18 hours after subcutaneous injection of reserpine— cf. Askew, Life Science, 2, 723 (1963).
4. Antagonism of norepinephrine-induced hypothermia in the mouse — 10mg/Kg followed by a further 10mg/Kg, administered orally, followed by intra-ventricular injection of norepinephrine — cf. Brittain, J.Pharm. Pharmac., 18, 621 (1966).
5. Potentiation of low-frequency electrical stimulation of the nictitating membrane of the cat, after doses ranging from 0.5 to 5mg/Kg of test compound, administered intravenously — cf. Thoenen, et al., Helv.physiol. Acta, 22, 15 (1964).
6. Potentiation of the effect of injected norepinephrine on the blood pressure of the cat, after the same dosages of test compound as in test (5) — cf. Halliwell et al., Brit.J.Pharmacol., 23, 330 (1964).

The results of the tests show that, in the three tests carried out on it, the product of Example I had a high degree of activity, while in each test it was more active than its 3-methyl analog. Similarly, in five out of the six tests carried out on it, the product of Example VII had a high degree of activity, while in three of the tests it was significantly more active than its 3-methyl analog, in two further tests it was equally as active, and in the sixth test it was only marginally less active than its 3-methyl analog.

What is claimed is:
1. A composition in dosage unit form useful for alleviating mental depression in a host comprising a pharmaceutical carrier and from about 5 mg. to about 500 mg. of a compound selected from the group consisting of those of the formula:

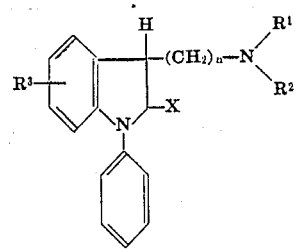

wherein $R^1$ and $R^2$ are each selected from the group consisting of hydrogen, alkyl of from one to four carbon atoms, benzyl and $R^1$ and $R^2$ when taken together, complete a ring selected from the group consisting of piperidine, pyrrolidino, morpholino, piperazino, N'-benzylpiperazino, N'-alkylpiperazino and N'-hydroxyalkylpiperazino, said alkyl containing from one to four carbon atoms; $R^3$ is selected from the group consisting of hydrogen, nitro and halogen, (F, Cl, Br, I); X is selected from the group consisting of two hydrogen atoms and an oxygen atom; n is an integer of from 2 to 4 and pharmaceutically acceptable acid addition salts thereof.

2. A composition as claimed in claim 1 wherein $R^3$ is hydrogen, n is 3, X is oxygen and $R^1$ and $R^2$ are methyl.

3. A composition as claimed in claim 1 wherein $R^3$ is hydrogen, n is 3, X is 2 hydrogen atoms, $R_2$ is methyl and $R^1$ is hydrogen.

4. A composition as claimed in claim 1 wherein X is two hydrogen atoms.

5. A composition as claimed in claim 4 wherein $R^2$ is methyl and $R^1$ is hydrogen.

* * * * *